Figure 1:
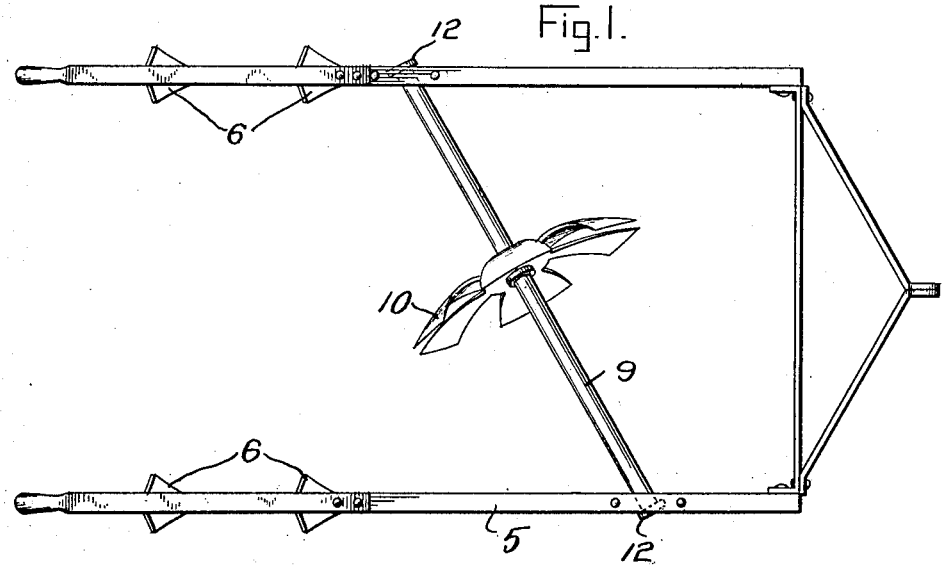

L. & J. P. DEWALD.
COTTON CHOPPER.
APPLICATION FILED AUG. 26, 1907.

913,878.

Patented Mar. 2, 1909.
2 SHEETS—SHEET 1.

Witnesses
C. K. Reichenbach
M. J. Miller

Inventors
L. Dewald
J. P. Dewald
By
Attorneys

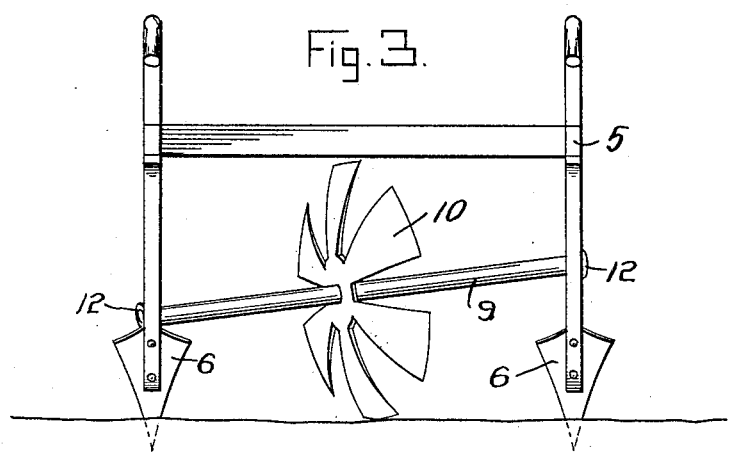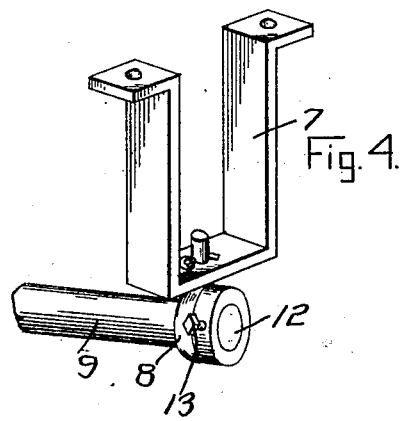

UNITED STATES PATENT OFFICE.

LOUIS DEWALD AND JOHN P. DEWALD, OF COPPERAS COVE, TEXAS.

COTTON-CHOPPER.

No. 913,878.     Specification of Letters Patent.     Patented March 2, 1909.

Application filed August 26, 1907. Serial No. 390,207.

*To all whom it may concern:*

Be it known that we, LOUIS DEWALD and JOHN P. DEWALD, citizens of the United States, residing at Copperas Cove, in the county of Coryell, State of Texas, have invented certain new and useful Improvements in Cotton-Choppers; and we do hereby declare the following to be a full, clear, and exact description of the invention, such as will enable others skilled in the art to which it appertains to make and use the same.

The present invention has reference to cotton choppers, and it aims to provide an exceedingly simple, inexpensive, and effective, device of that class which may be attached to and detached from the frame of a cultivator.

To this end the invention resides in the provision of a peripherally notched concavo-convex disk mounted upon a shaft having its opposite ends fitted in boxes carried by the side beams of the cultivator frame, one of the boxes being set slightly in advance of the other so as to dispose the cutting disk at an acute angle to the row of plants.

The invention will be readily understood from a consideration of the following detailed description, and its preferred embodiment is illustrated in the accompanying drawings, in which like parts are designated by corresponding reference numerals throughout the several views.

Figure 2:
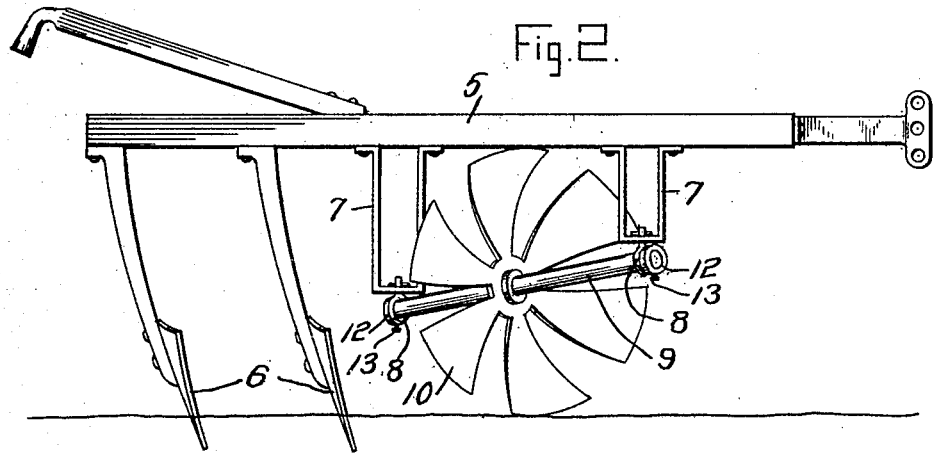

Of the said drawings, Figure 1 is a top plan view of the invention, Fig. 2 is a side elevation, Fig. 3 is a rear elevation, Fig. 4 is an enlarged detail view of one of the axle-carrying boxes, a portion of the adjacent end of the axle and its collar, being likewise shown.

Referring more particularly to the drawings, 5 designates generally the frame of the cultivator, whose side beams are each provided toward their rear ends with a pair of shoes 6, of any preferred type. Toward the forward end each beam carries a U-shaped bracket 7, the out-turned free ends of whose arms are bolted or otherwise secured thereto, the bight portion of each bracket being provided centrally with a perforation through which the stem of an eye-bolt 8 passes, said bolts being held against displacement by means of split pins or similar fasteners. Through the eyes of said bolts the opposite ends of a shaft 9 extend, said shaft carrying a concavo-convex cutting disk 10 provided with a series of notches 11 extending inwardly toward the center of the disk from the periphery thereof, as shown. The right-hand bracket whose length is somewhat less than that of the left-hand bracket is positioned a slight distance in advance of the latter, thus disposing the shaft at an angle of about 30° to the frame beams and the cutting disk at a similar angle to the row of plants. The shaft is provided at opposite ends with collars 12, each of which carries a set-screw 13 whose inner end impinges against the corresponding end of the shaft, the collars being retained in adjusted position upon the shaft by such means. The collars are disposed upon corresponding sides of the eye-bolts and thus serve to hold the shaft against endwise movement. It will be apparent, however, that when the set-screws 13 are loosened the shaft may be moved in either direction to bring the cutting disk nearer one beam or the other.

The cutting disk is preferably detachably carried by its shaft 9 and is held in place thereon by means of collars so that it may be removed therefrom and a disk having a greater number of notches formed therein substituted.

Owing to the particular disposition of the cutting disk and to the formation of the notches therein, it will be apparent that the blades formed by said notches strike the rows of plants at an angle, thinning the rows by cutting down all such plants as come in contact with the blades, leaving only the plants opposite which the notches between the blades are brought. The angular disposition of said blades will further result in a shear cut, as will be obvious.

What is claimed, is,

1. The combination, in a cotton chopper of a frame having side beams; a U-shaped bracket secured to each side beam; shaft supporting means secured to the bight portion of each bracket; an endwise adjustable shaft engaged at opposite ends with said means, one of said brackets being positioned in advance of the other, to dispose said shaft at an angle to the side beams; a notched cutting disk secured to said shaft; and a pair of adjustable collars carried by said shaft at opposite ends thereof, and adapted for contact with said supporting means to prevent endwise movement of the shaft, when the latter is in adjusted position.

2. The combination, in a cotton chopper of a frame having side beams; a U-shaped bracket secured to each side beam; the bight portion of each bracket having an opening formed therethrough; an eye-bolt carried by each bracket and having its stem extending through the opening therein; an endwise adjustable shaft engaged at opposite ends with said eye-bolts, one of said brackets being positioned in advance of the other, to dispose said shaft at an angle to the side beams; a peripherally notched cutting disk secured to said shaft; and a pair of adjustable collars carried by said shaft at opposite ends thereof, and adapted for contact with said eye-bolts to prevent endwise movement of the shaft when the latter is in adjusted position.

3. The combination, in a cotton chopper, of a frame having side beams; a depending U-shaped bracket secured to each side beam; an endwise adjustable shaft engaged at opposite ends with the bight portions of the brackets, one of said brackets having a greater length that the other bracket and being located rearwardly thereof, to dispose the shaft at an angle to said side beams and to the plane of the frame; a notched cutting disk carried by the shaft; and a pair of adjustable collars carried by said shaft at opposite ends thereof, for preventing endwise movement of the shaft when the latter is in adjusted position.

4. The combination in a cotton chopper, of a frame having side beams; a U-shaped bracket secured to each side beam, the bight portion of each bracket having an opening formed therethrough; an eye-bolt carried by each bracket and having its stem extending through the opening therein; an endwise adjustable shaft engaged at opposite ends with said eye-bolts, one of said brackets having a greater length than the other bracket and being positioned rearwardly thereof, to dispose the shaft at an angle to the side beams and to the plane of the frame; a peripherally-notched cutting disk secured to said shaft; and a pair of adjustable collars carried by said shaft at opposite ends thereof, and adapted for contact with said eye-bolts to prevent endwise movement of the shaft when the latter is in adjusted position.

In testimony whereof, we affix our signatures in presence of two witnesses.

LOUIS DEWALD.
JOHN P. DEWALD.

Witnesses:
H. E. DICKSON,
OTTO KATTNER.